(12) United States Patent
Santos et al.

(10) Patent No.: US 7,984,850 B2
(45) Date of Patent: Jul. 26, 2011

(54) DRILL GAUGE AND FINANCIAL TRANSACTION ASSEMBLY

(75) Inventors: Leo Santos, Dallas, TX (US); Nathan D. Ehrlich, Duluth, GA (US)

(73) Assignee: Home Depot USA, Inc., Atlanta, GA (US)

( * ) Notice: Subject to any disclaimer, the term of this patent is extended or adjusted under 35 U.S.C. 154(b) by 47 days.

(21) Appl. No.: 12/466,941

(22) Filed: May 15, 2009

(65) Prior Publication Data

US 2010/0288833 A1    Nov. 18, 2010

(51) Int. Cl.
*G06K 5/00*    (2006.01)
*B65D 85/28*    (2006.01)
*G01B 3/34*    (2006.01)
*G09F 11/00*    (2006.01)

(52) U.S. Cl. ...... 235/380; 235/375; 33/555.2; 33/199 R; 206/379; 40/1

(58) Field of Classification Search .................. 235/380; 33/555.2, 199 R; 206/379; 40/1
See application file for complete search history.

(56) References Cited

U.S. PATENT DOCUMENTS

| | | | | | |
|---|---|---|---|---|---|
| 2,728,145 | A | * | 12/1955 | Holladay | 33/199 R |
| 2,830,380 | A | * | 4/1958 | Rumonoski | 33/199 R |
| D471,826 | S | * | 3/2003 | Rosenstein | D10/64 |
| 6,588,589 | B1 | * | 7/2003 | Gustavson | 206/379 |
| 2007/0241197 | A1 | * | 10/2007 | Lindahl et al. | 235/487 |

FOREIGN PATENT DOCUMENTS

GB    2277482 A    * 11/1994

* cited by examiner

*Primary Examiner* — Daniel A Hess
*Assistant Examiner* — Laura Gudorf
(74) *Attorney, Agent, or Firm* — Issac T. Lin

(57) ABSTRACT

A financial transaction card assembly is described. Specifically, the financial transaction card assembly comprises a drill gauge, at least one drill bit, and a substrate. The drill gauge and the drill bit may be removably coupled to the substrate. The drill gauge may be used to measure a plurality of drill bit sizes, and to purchase retail goods and services. The drill bit may be coupled to a drill to make holes in metal, wood, and plastic materials.

14 Claims, 3 Drawing Sheets

DRILL GAUGE AND FINANCIAL TRANSACTION ASSEMBLY

FIELD OF THE INVENTION

The present invention generally relates to a financial transaction card assembly. More particularly, the assembly may provide a financial transaction card to be used at a retail store, a drill bit gauge, and at least one drill bit.

BACKGROUND OF THE INVENTION

Financial transaction cards give customers the ability to pay for retail goods in advance or on credit. Examples of common transaction cards include credit cards, debit cards, and gift cards. Financial transaction cards typically are approximately 3⅓ inch×2⅛ inch in dimension.

SUMMARY OF THE INVENTION

An apparatus to be offered in retail stores is provided. The apparatus may comprise a substrate, a financial transaction card, and a drill bit. The financial transaction card and the drill bit may be removably coupled to the substrate. The financial transaction card may define a plurality of through holes to measure drill bit sizes, wherein each plurality of through holes has a unique diameter. The drill may have a diameter that is approximately equal to the diameter of one of the plurality of through holes.

A method for implementing a financial transaction card assembly is also provided. The method may include coupling a drill gauge to a substrate, printing an account identifier on a surface of the drill gauge, and coupling at least one drill bit to the substrate.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 1:
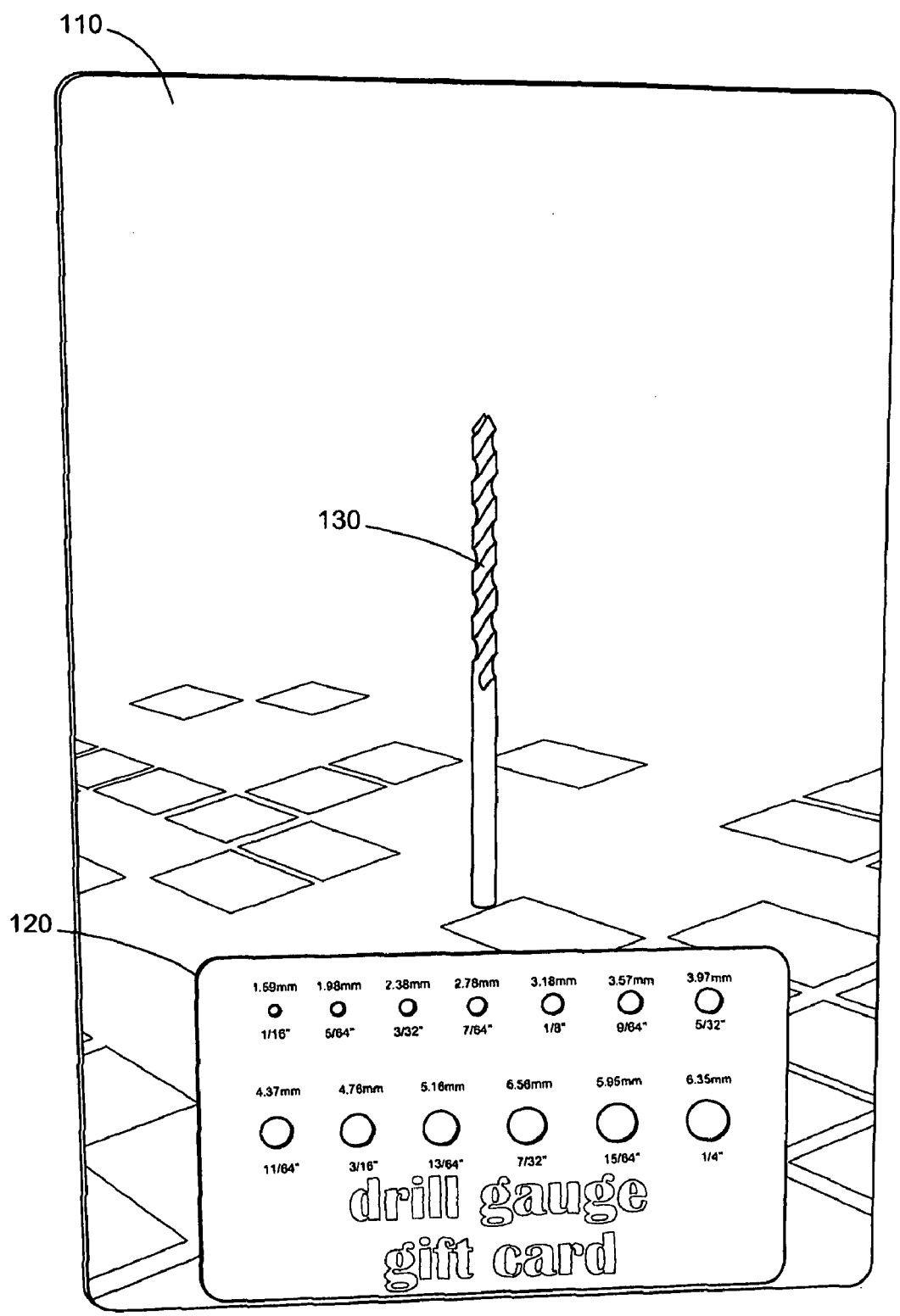
FIG. 1 is a perspective view of one embodiment of a financial transaction card assembly.

FIG. 1 depicts an embodiment of a drill gauge financial transaction card assembly. The assembly comprises a substrate 110, a drill gauge 120, and a drill bit 130. The drill gauge 120 and the drill bit 130 may be coupled to the substrate 110. The substrate 110 may be comprised of plastic or paper. The drill gauge 120 may be comprised of plastic or paper, and may be used to measure a plurality of metric and imperial drill bit sizes. The drill bit 130 may be comprised of metal and be coupled to an electric or battery operated drill for forming holes in wood, metal, or plastic.

Although FIG. 1 only depicts one drill bit 130, a plurality of drill bits may be coupled to the substrate 130. The drill bit 130 may have a diameter that is approximately the size of a through hole defined by the drill gauge 120. For one embodiment of the invention, the drill gauge 120 and/or the drill bit 130 are coupled to the substrate 110 via an adhesive. For another embodiment of the invention, the drill gauge 120 and/or the drill bit 130 are coupled to the substrate 110 via a shrink wrap.

Figure 2A:
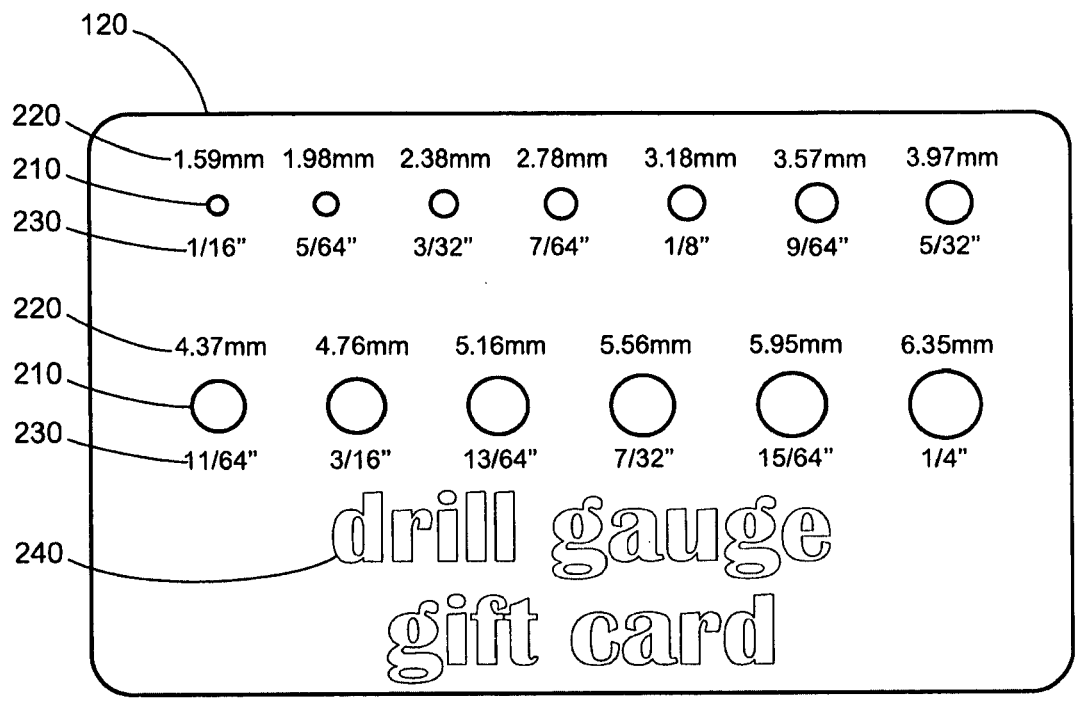
FIG. 2A is a front view of one embodiment of a financial transaction card.

FIG. 2A depicts a top view of an embodiment of the drill gauge 120. The top of drill gauge 120 may define a plurality of through holes 210, and comprises a plurality of metric labels 220, a plurality of imperial labels 230, and advertising label 240. The plurality of metric labels 220, the plurality of imperial labels 230, and advertising label 240 may be printed, attached, or etched to the drill gauge 120. The advertising label 240 may be decorative to catch the eye of a consumer, and it may provide information as to where the financial transaction card 120 may be redeemed.

Each of the plurality of through holes 210 may have a unique diameter. For example, each of the plurality of through holes 210 may be approximately the diameter of a drill bit. Each of the plurality of metric labels 220 and imperial labels 230 corresponds to each of the plurality of through holes 210.

For the embodiment of the invention shown in FIG. 2A, the drill gauge 120 comprises thirteen unique through holes 210, thirteen metric labels 220, and thirteen imperial labels 230. The first through hole corresponds to the first metric label, 1.59 millimeters, and the first imperial label, 1/16 inch. The second through hole corresponds to the second metric label, 1.98 millimeters, and the second imperial label, 5/64 inch. The third through hole corresponds to the third metric label, 2.38 millimeters, and the third imperial label, 3/32 inch . . . . All thirteen metric labels and imperial labels, and their corresponding through holes shown in the embodiment of the invention in FIG. 2A are listed in Table 1 below.

TABLE 1

| Through Hole | Metric Label | Imperial Label |
|---|---|---|
| 1 | 1.59 millimeters | 1/16 inch |
| 2 | 1.98 millimeters | 5/64 inch |
| 3 | 2.38 millimeters | 3/32 inch |
| 4 | 2.78 millimeters | 7/64 inch |
| 5 | 3.18 millimeters | 1/8 inch |
| 6 | 3.57 millimeters | 9/64 inch |
| 7 | 3.97 millimeters | 5/32 inch |
| 8 | 4.37 millimeters | 11/64 inch |
| 9 | 4.76 millimeters | 3/16 inch |
| 10 | 5.16 millimeters | 13/64 inch |
| 11 | 5.56 millimeters | 7/32 inch |
| 12 | 5.95 millimeters | 15/64 inch |
| 13 | 6.35 millimeters | 1/4 inch |

Figure 2B:
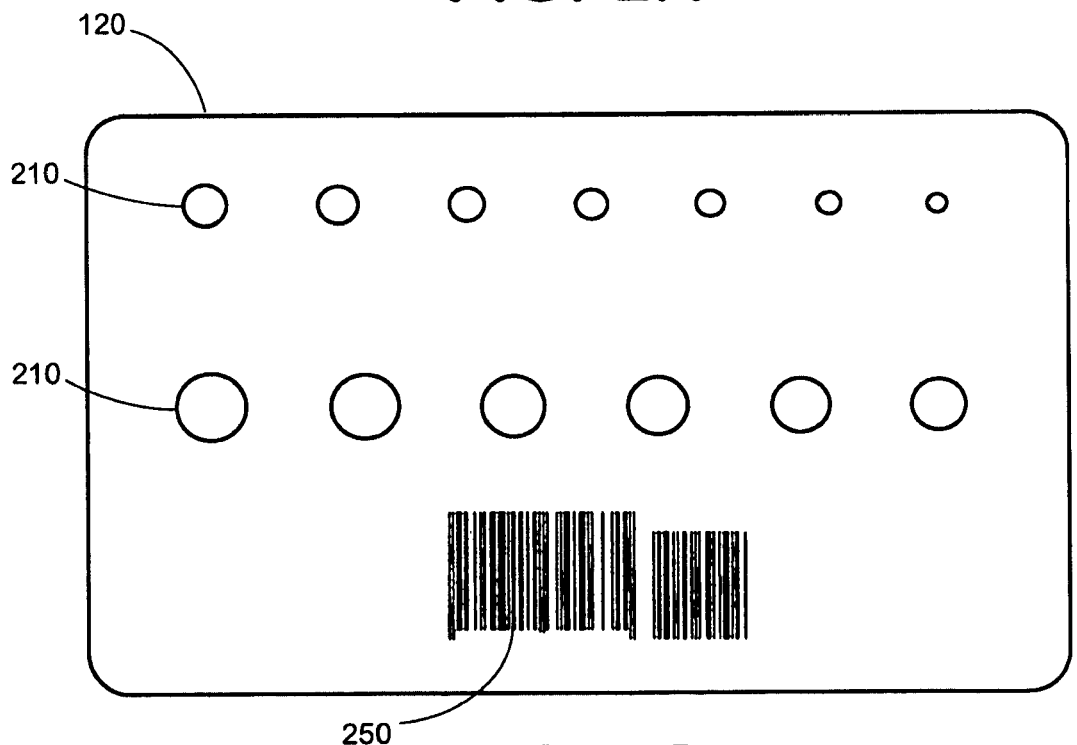
FIG. 2B is a rear view of one embodiment of a financial transaction card.

FIG. 2B shows a bottom view of an embodiment of the drill gauge 120. The bottom of the drill gauge 120 may define a plurality of through holes 210, and may comprise an account identifier 250. For one embodiment of the invention, the account identifier 250 may be a barcode. For another embodiment of the invention, the account identifier 250 may be a magnetic strip. The account identifier 250 may be printed, attached, or etched to the drill gauge 120.

Thus, in addition to measuring drill bit sizes, the drill gauge 120 may function as a financial transaction card. The account identifier 130 may identify a financial account. Money values may be added to, or deleted from, the financial account. For example, money may be added to the financial account by prepaying a monetary value. Money may be deleted from the financial account by purchasing goods or services from a retail store. A retail store may also allow goods or services to be purchased on credit from the financial account.

Figure 3:
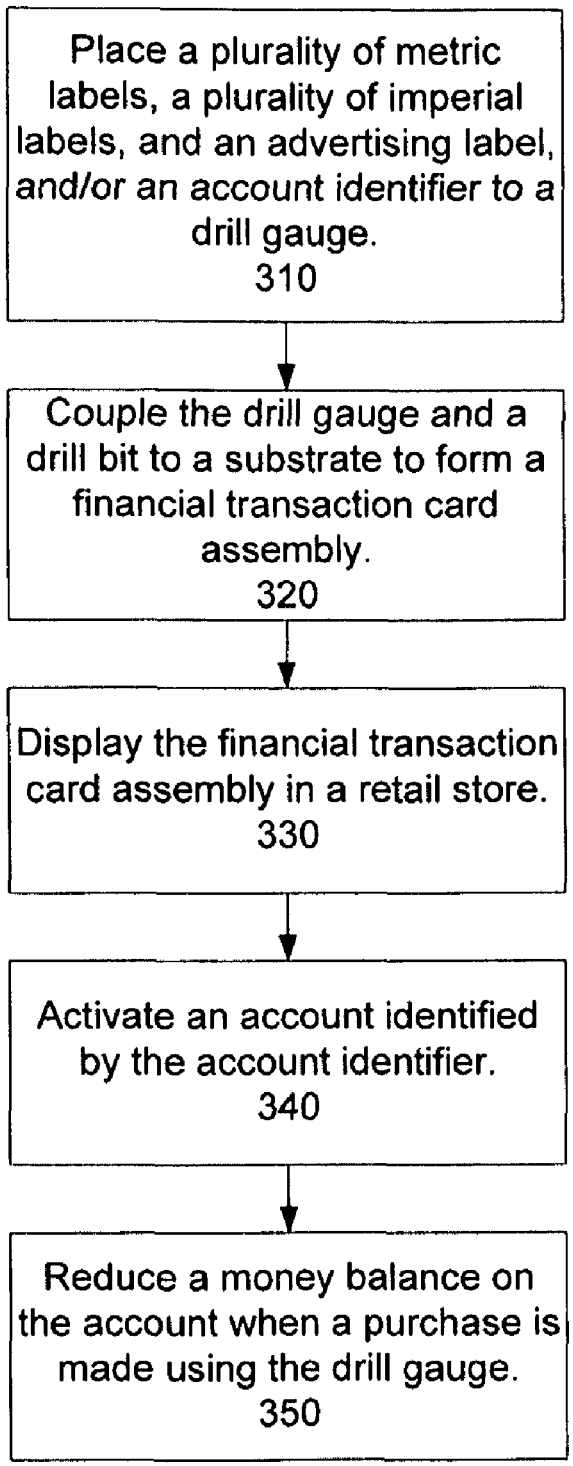
FIG. 3 is a flowchart of an embodiment of a process for implementing a financial transaction card assembly.

FIG. 3 shows a flowchart for implementing a financial transaction card assembly. In operation 310, a plurality of metric labels, a plurality of imperial labels, an advertising label, and/or an account identifier is printed, attached, etched, or otherwise placed on a drill gauge. In operation 320, the drill gauge and at least one drill bit are coupled to a substrate. The drill gauge and the at least one drill bit may be coupled to the substrate by an adhesive, a tape, or a shrink wrap to form a financial transaction card assembly.

In operation 330, the financial transaction card assembly is displayed in a retail store. The retail store may be a hardware store. The financial transaction card assembly may be purchased by a customer. The drill gauge and the at least one drill bit may be removed by the customer after purchase. In operation 340, the financial account identified by the account identifier on the drill gauge may be activated. Once activated, a money balance may be added to the financial account. For another embodiment of the invention, the customer may purchase the financial transaction card assembly with an existing money balance.

The customer may subsequently use the drill gauge to measure drill bit sizes or to purchase retail goods. In operation 350, the money balance may be reduced from the financial account associated with the drill gauge account identifier at a point of sale to the customer. Alternatively, a purchase may be made on credit using the drill gauge.

In the forgoing specification, the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. An apparatus, comprising:
   a flat substrate;
   a financial transaction card coupled to the substrate, wherein the financial transaction card defines a plurality of through holes to measure drill bit sizes, wherein each of the plurality of through holes has a unique diameter;
   a drill bit coupled to the substrate, wherein the drill bit has a diameter that is approximately equal to the diameter of one of the plurality of through holes.

2. The apparatus of claim 1, wherein the substrate is comprised of paper.

3. The apparatus of claim 1, wherein the substrate is comprised of plastic.

4. The apparatus of claim 1, wherein the financial transaction card has an account identifier imprinted on a surface of the financial transaction card.

5. The apparatus of claim 1, wherein each of the plurality of through holes has a corresponding bit size label.

6. The apparatus of claim 5, wherein each bit size label is in metric units.

7. The apparatus of claim 5, wherein each bit size label is in imperial units.

8. The apparatus of claim 1, wherein the financial transaction card comprises an advertising label.

9. A method, comprising:
   adhesively coupling a drill gauge to a flat substrate, wherein the drill gauge defines a plurality of through holes to measure drill bit sizes, wherein each of the plurality of through holes has a unique diameter;
   printing an account identifier on a surface of the drill gauge;
   coupling at least one drill bit to the substrate wherein the drill bit has a diameter that is approximately equal to the diameter of one of the plurality of through holes.

10. The method of claim 9, further comprising:
    activating an account identified by the account identifier.

11. The method of claim 9, further comprising:
    selling a retail product to a customer, wherein payment from the customer is received via the account identified by the account identifier.

12. The method of claim 9, further comprising:
    displaying the substrate having the drill gauge and drill bit in a retail store.

13. The method of claim 10, further comprising:
    charging an account identified by the account identifier at a point of sale.

14. The method of claim 12, wherein the retail store sells hardware goods.

* * * * *